United States Patent

Kassuelke et al.

[11] Patent Number: 6,162,314
[45] Date of Patent: Dec. 19, 2000

[54] THERMAL WELDING OF FIBER REINFORCED THERMOPLASTIC PREPREG

[75] Inventors: Gregory T. Kassuelke, Maple Grove; Stephen A. Haglund, Minnetonka, both of Minn.

[73] Assignee: Alliant Techsystems Inc., Hopkins, Minn.

[21] Appl. No.: 09/162,680

[22] Filed: Sep. 29, 1998

[51] Int. Cl.$^7$ ................................................. B29C 65/18
[52] U.S. Cl. ........................ 156/182; 156/264; 156/266; 156/290; 156/553; 156/581; 156/583.1
[58] Field of Search .................................. 156/182, 264, 156/265, 266, 290, 358, 359, 553, 581, 583.1, 583.4, 583.91; 102/520

[56] References Cited

U.S. PATENT DOCUMENTS

| | | | |
|---|---|---|---|
| 2,596,933 | 5/1952 | Kirk | 156/583.1 |
| 2,999,042 | 9/1961 | Meister | 156/290 |
| 3,325,331 | 6/1967 | Schwanekamp et al. | 156/290 |
| 3,369,547 | 2/1968 | Sack et al. | 156/264 |
| 3,996,089 | 12/1976 | More et al. | 156/264 |
| 4,083,095 | 4/1978 | Flaum et al. | 156/264 |
| 4,295,912 | 10/1981 | Burns | 156/553 |
| 4,673,450 | 6/1987 | Burke | 156/308.2 |
| 5,066,352 | 11/1991 | Albers et al. | 156/264 |
| 5,418,035 | 5/1995 | Iguchi et al. | 156/290 |
| 5,451,479 | 9/1995 | Ishibashi | 430/22 |
| 5,482,589 | 1/1996 | Shin et al. | 156/265 |
| 5,635,660 | 6/1997 | McGovern | 86/21 |
| 5,640,054 | 6/1997 | McGovern | 264/3.1 |
| 5,747,725 | 5/1998 | Stewart et al. | 102/521 |
| 5,789,699 | 8/1998 | Stewart et al. | 102/521 |
| 5,960,296 | 9/1999 | Auzino et al. | 438/401 |

FOREIGN PATENT DOCUMENTS

| | | | |
|---|---|---|---|
| 3031103 | 3/1982 | Germany . | |
| 53-6377 | 1/1978 | Japan | 156/581 |
| 7-227841 | 8/1995 | Japan . | |
| 1390810 | 7/1973 | United Kingdom | 156/553 |
| 1332037 | 10/1973 | United Kingdom | 156/290 |

*Primary Examiner*—Steven D. Maki
*Attorney, Agent, or Firm*—George A. Leone, Sr.; Mark Goldberg

[57] ABSTRACT

A welding method controls the welding temperature, welding cycle time, and welding pressure for fabrication of composite structural parts. A welding unit welds multiple plies of thermoplastic prepreg into welded multi-ply assemblies by concentrating welds along the thermoplastic prepreg plies at localized and strategic positions. Two platens weld a plurality of the multi-ply assemblies into a layup using a plurality of heated pins. The heated pins are hollow to reduce surface heating during welding and are non-uniformly shaped to allow indexing of the layup. After the layup is cut into a plurality of thermoplastic prepreg segments along a layup pattern, the thermoplastic prepreg segments are indexed according to the weld marks impressed by the non-uniformly shaped heated pins. The thermoplastic prepreg segments are formed into kits or wedges by stacking smaller thermoplastic prepreg segments on top of larger thermoplastic prepreg segments.

12 Claims, 6 Drawing Sheets

THERMAL WELDING OF FIBER REINFORCED THERMOPLASTIC PREPREG

FIELD OF THE INVENTION

The present invention is generally related to preimpregnated fiber reinforced material, and, in particular, to the thermal welding of fiber reinforced thermoplastic prepreg.

BACKGROUND OF THE INVENTION

Thermoplastic prepreg is used to make structural parts for various devices strong, rigid, and lightweight. Thermoplastic prepreg is the material resulting from impregnating fiber reinforcements with a formulated resin. These advanced composite materials offer many advantages over conventional steel and aluminum since composite parts fabricated from thermoplastic prepreg materials are generally stronger and stiffer than metals. Components fabricated from thermoplastic prepreg materials also provide greater resistance to fatigue, creep, wear and corrosion than metals.

In use, several thermoplastic prepreg plies with different fiber orientations are assembled into layers and two layers are stacked on top of each other to form a layup. The layup is then cut into thermoplastic prepreg segments. The thermoplastic prepreg segments are then assembled into a kit or wedge to form a particular structural part of the device under construction. Assembly of the kits or wedges requires stacking the thermoplastic prepreg segments in sequence and orienting the pieces according to a geometry envelope. By cutting the thermoplastic prepreg segments from layups, the structural parts of the device receive strength in more than one direction. Composite parts made from thermoplastic prepreg have very high strength in the direction of the fibers and very poor strength in other directions.

Layups are useful because they reduce the amount of time required to tailor the architecture and to catalog the thermoplastic prepreg segments of a particular device part. However, since thermoplastic prepreg material has a very low coefficient of friction, or no tackiness, the plies tend to slide, making stacking, cutting, and assembly extremely difficult. The thermoplastic prepreg plies forming a layup must be retained in alignment during and after cutting. If the thermoplastic prepreg plies are not held together during all stages of assembly, it becomes difficult and labor intensive.

After cutting thermoplastic prepreg segments from a layup, it is advantageous to retain the thermoplastic prepreg segments together in alignment during assembly of the pieces into a kit. Some thermoplastic prepreg segments are bulky and some are very small, so working with thermoplastic prepreg segments that are properly held together greatly reduces assembly time and difficulty. Each thermoplastic prepreg segment must be fastened to corresponding pieces as they are stacked and oriented as part of a kit or wedge. Several kits or wedges are typically molded together to form a composite part, such as a cylinder for a sabot.

One attempt to solve the problem of holding plies during layup assembly and cutting involved melting the thermoplastic prepreg plies together. However, conventional cutting methods have proven unsuitable for cutting such layup. If the layup is too thin, severe warping can occur during cutting.

Yet another unsatisfactory attempt to solve the problem of holding plies in alignment during layup assembly and cutting used welding the thermoplastic prepreg plies together with standard methods. Unfortunately, due to sustained high heat exposure, too many welds, and/or improper placement of welds, existing welding methods often cause thermal defects to the thermoplastic prepreg. Examples of such defects include undulation next to the weld seams, warping and shrinking, flaws and the like.

Also lacking in the prior art is an adequate method for identifying segmented pieces of the layup during assembly into kits or wedges. Nor has an adequate method been found for retaining segmented pieces in alignment for molding once they are stacked and oriented as part of a kit.

SUMMARY OF THE INVENTION

The present invention provides a thermal welding method and apparatus for welding thermoplastic prepreg material. In accordance with the method of the invention a thermoplastic prepreg material is welded into a multi-ply assembly by concentrating welds at a plurality of predetermined weld points. A plurality of welded multi-ply assemblies is aligned into a layup. The layup is patterned with a layup pattern including indexing marks. The layup is cut along said layup pattern into a plurality of indexed thermoplastic prepreg segments. The indexed thermoplastic prepreg segments are stacked into a plurality of kits or wedges aligned according to the indexing marks. The plurality of kits or wedges are molded together to form composite parts.

Other objects, features and advantages of the present invention will become apparent to those skilled in the art through the description of the preferred embodiment, claims and drawings wherein like numerals refer to like elements.

DETAILED DESCRIPTION OF THE PREFERRED EMBODIMENT

Figure 1:
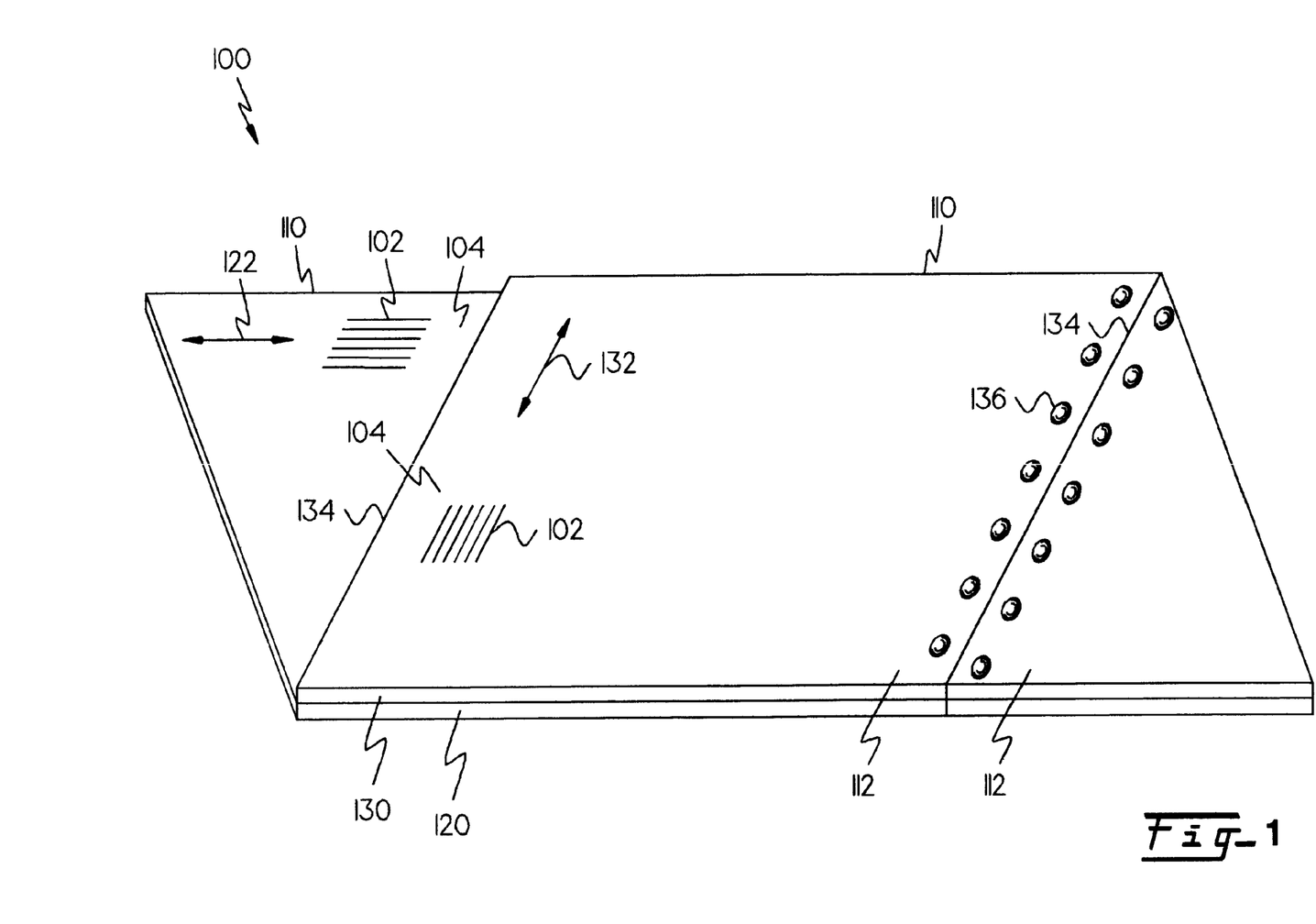
FIG. 1 is perspective view of one example of a multi-ply assembly of the present invention.

Now referring to FIG. 1, FIG. 1 shows a perspective view of one example of a multi-ply assembly 100 of the present invention. Multi-ply assembly 100 is comprised of a plurality of plies 112. Plies 112 are advantageously fabricated from thermoplastic prepreg material 110, wherein thermoplastic prepreg material 110 is comprised of a plurality of carbon fibers 102 and thermoplastic resin 104. Further, plies 112 are cut and stacked to form a first layer 120 and a second layer 130 of multi-ply assembly 100.

Plies 112 of first layer 120 are cut and placed so that carbon fibers 102 align along a warp direction 122, wherein warp direction 122 is oriented at zero degrees with respect to multi-ply assembly 100. Plies 112 of second layer 130 are cut and placed so that carbon fibers 102 align along a non-warp direction 132, herein non-warp direction 132 runs parallel to ply seams 134. Those skilled in the art, having the benefit of this disclosure, will understand non-warp direction 132 may be oriented at substantially any angle within a range of angles relative to warp direction 122 depending on the structural requirements of the object under construction. For example, the non-warp direction may be offset from the warp direction at 45°, 30°, 135°, or 120°. Such offsets are known to be useful in the construction of composite sabot parts. Structural requirements and the design of the desired composite part advantageously determine the angle selected.

Spot welds 136 are advantageously placed substantially equidistant from and on either side of ply seams 134. By advantageously placing spot welds 136 along ply seams 134, and therefore along non-warp direction 132, multi-ply assembly 100 is held together with substantially no warping or undulations and may be cut by conventional cutting methods.

Figure 2A:
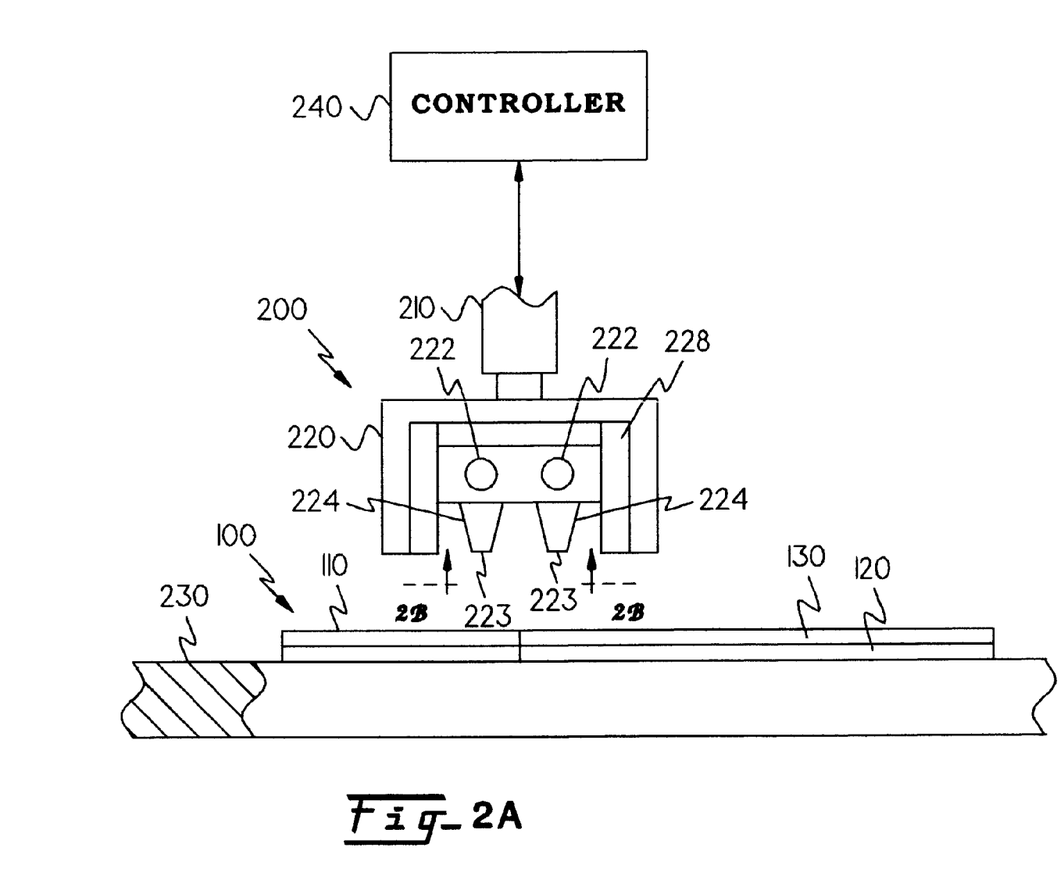
FIG. 2A is cross-sectional side view of one example of a first means for welding of the present invention.

Now referring to FIG. 2A, FIG. 2A shows a cross-sectional side view of one example of a first means for welding 200. First means for welding 200 is shown above multi-ply assembly 100, as first means for welding 200 forms spot welds 136 (shown in FIG. 1) on multi-ply assembly 100. First means for welding 200 is comprised of a first pressure cylinder 210 attached to a weld housing 220. Weld housing 220 contains a plurality of welding tips 224, wherein welding tips 224 are mounted to and heated by a plurality of electric heaters 222. Weld housing 220 is insulated from electric heaters 222 by insulation 228.

Welding tips 224 are conical in shape and are advantageously tapered to welding ends 223 to concentrate heat from electric heaters 222 to welding ends 223. By concentrating the heat to welding ends 223, welding contact time, or more commonly welding "cycle time", between welding tips 224 and thermoplastic prepreg material 110 of multi-ply assembly 100 is reduced. Reducing cycle time still allows first layer 120 and second layer 130 to bond; however, less heat is transferred through thermoplastic prepreg material 110, which substantially eliminates warping and undulation around spot welds 136 (shown in FIG. 1).

In use, multi-ply assembly 100 is placed on a non-thermal transferring substrate 230, such as wood or firebrick. Substrate 230 further reduces warping and undulation by thermally insulating multi-ply assembling 100 during welding and by not adhering to multiply assembly 100 after welding.

Cycle time, welding temperature, and welding pressure are controlled by a means for controlling 240. Means for controlling 240 may comprise a conventional controller, for example, including a personal computer or the like. The means for controlling may advantageously include conventional input devices such as a keyboard and mouse. The means for controlling 240 may alternatively comprise conventional electronics mounted within a control panel having manual or automatic controls as desired for controlling system parameters such as, for example, welding period, pressure, temperature and other system parameters. Another alternative for control means 240 may advantageously be a numerically encoded control system. Such controls may be designed using standard engineering design techniques.

In the example embodiment, means for controlling 240 is in communication with first pressure cylinder 210 to control cycle time and welding pressure. Means for controlling 240 also controls electric heaters 222 to control welding temperature. In one useful embodiment, temperatures for electric heaters 222 that heat welding tips 224, range from 350 degrees Fahrenheit to 800 degrees Fahrenheit.

Figure 2B:
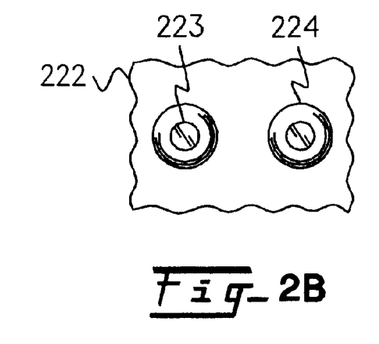
FIG. 2B is a bottom view of one example of a first means for welding the multi-ply assembly of FIG. 1 of the present invention taken generally along a bottom view as indicated by line 2B—2B of FIG. 2A.

Now referring to FIGS. 2A and 2B, FIG. 2B is a bottom view of one example of first means for welding 200 using welding tips 224 of the present invention taken generally along line 2B—2B of FIG. 2A. As in FIG. 2A, welding tips 224 are mounted to and heated by electric heaters 222. Welding tips 224 taper to welding ends 223 to advantageously concentrate the heat from electric heaters 222 to welding ends 223.

Figure 2C:
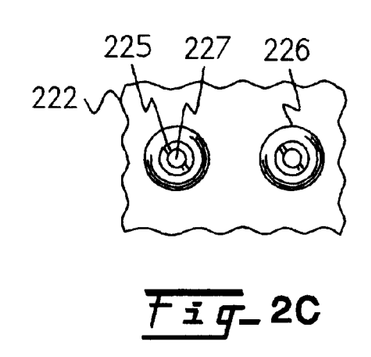
FIG. 2C is a bottom view of an alternative example of a first means for welding of the present invention.

Now referring to FIGS. 2A, 2B, and 2C, FIG. 2C is a bottom view of an alternative example of first means for welding 200 using a plurality of hollow welding tips 226 of the present invention. Hollow welding tips 226 are mounted to and heated by electric heaters 222. Hollow welding tips 226 taper to hollow welding ends 225 to advantageously concentrate the heat from electric heaters 222. Additionally, hollow-welding tips 226 advantageously have hollow centers 227 that extend into hollow welding tips 226.

Hollow welding ends 225 advantageously contact a smaller area of thermoplastic prepreg material 110 of multi-ply assembly 100 than welding ends 223 of welding tips 224. Reducing the amount of thermoplastic prepreg material 110 subject to heat still allows first layer 120 and second layer 130 to bond during the welding cycle. However, less heat is transferred through thermoplastic prepreg material 110, which further eliminates warping and undulation around spot welds 136 (shown in FIG. 1).

Figure 3:
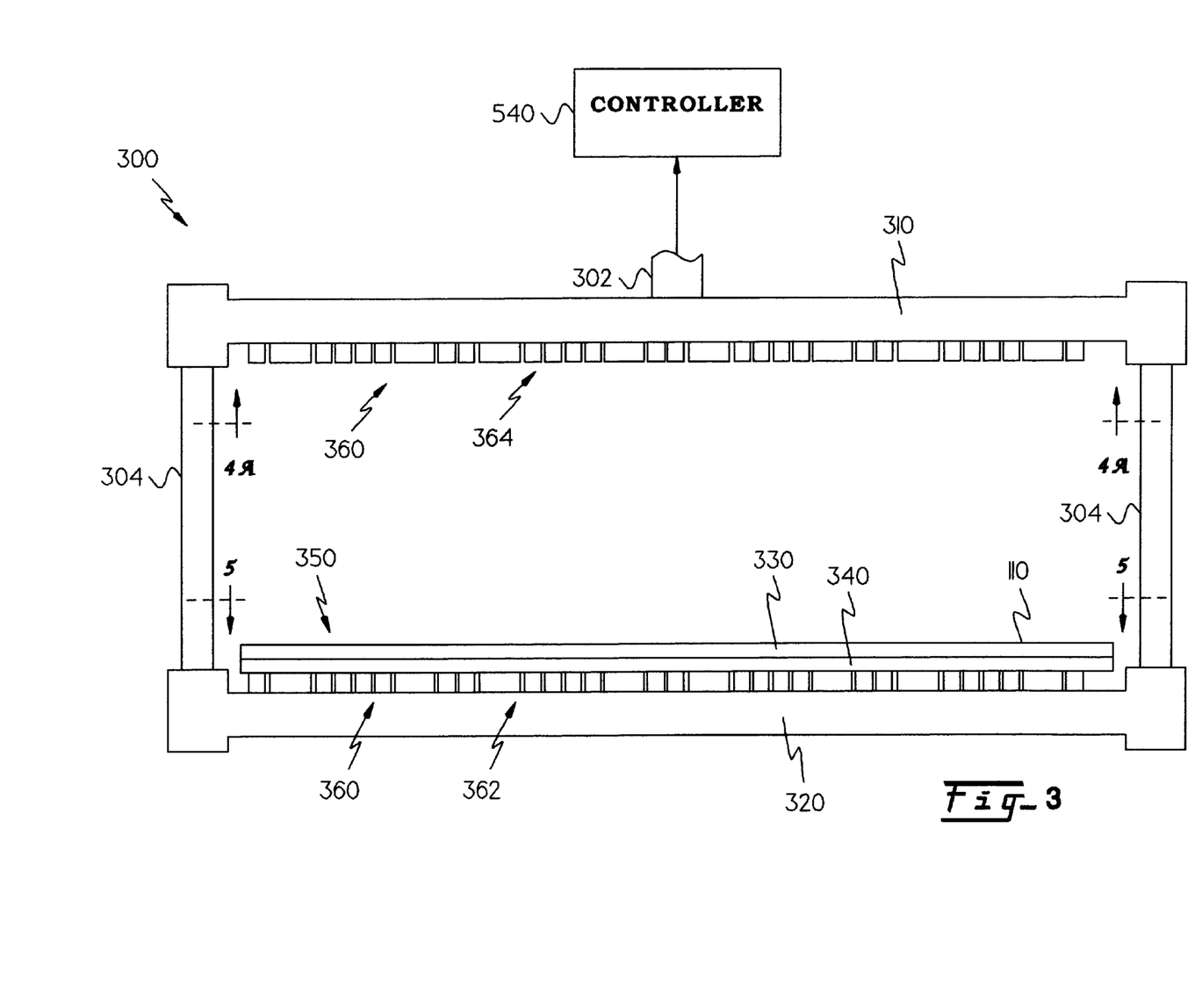
FIG. 3 is a side view of one example of a second means for welding of the present invention.

Now referring to FIG. 3, FIG. 3 shows a side view of one example of a second means for welding 300. Second means for welding 300 has a second pressure cylinder 302 mounted to a top platen 310. Top platen 310 travels vertically along a plurality of guides 304 to a bottom platen 320. Both top platen 310 and bottom platen 320 are electrically heated in a range from 350 degrees Fahrenheit to 800 degrees Fahrenheit.

A plurality of heat pins 360, comprising a plurality of bottom heat pins 362 and a plurality of top heat pins 364, are mounted to top platen 310 and bottom platen 320, respectively. Heat transfers from top platen 310 to top heat pins 364 and from bottom platen 320 to bottom heat pins 362. Top heat pins 364 and bottom heat pins 362 simultaneously weld a top multi-ply assembly 330 and a bottom multi-ply assembly 340 into a layup 350. By welding top multi-ply assembly 330 and bottom multi-ply assembly 340 simultaneously, the welding cycle time is reduced and less heat is transferred to thermoplastic prepreg material 110 of layup 350. Thus, layup 350 is held together with substantially no warping or undulations and may be cut by conventional cutting methods.

Cycle time, welding temperature, and welding pressure are controlled by means for controlling 540. Means for controlling 540 may advantageously be built similarly to means for controlling 240 described above. Means for controlling 540 is in communication with second pressure cylinder 302 to control cycle time and welding pressure, and means for controlling 540 is in communication with top platen 310 and bottom platen 320 to control welding temperature.

Figure 4A:
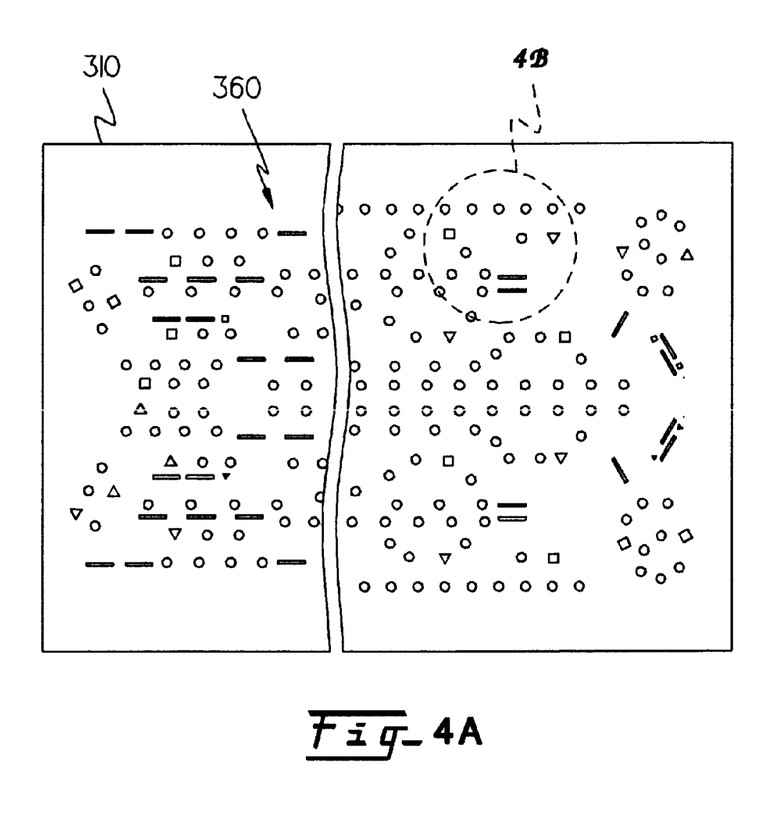
FIG. 4A is a bottom view of one example of a top platen of the present invention taken generally along line 4A—4A of FIG. 3.

Now referring to FIG. 4A, FIG. 4A is a bottom view of one example of top platen 310 of the present invention taken generally along line 4A—4A of FIG. 3. Top platen 310 has heat pins 360.

Figure 4B:
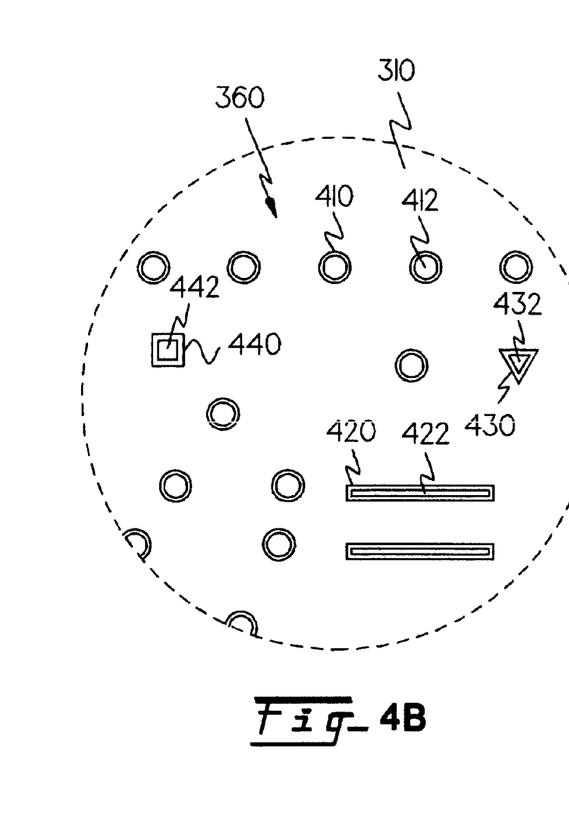
FIG. 4B is a partial detailed view of one example of a plurality of heat pins of the present invention as depicted in FIG. 4A.

Now referring to FIG. 4B, FIG. 4B is a partial detailed view of one example of heat pins 360 of the present invention as depicted in FIG. 4A. Heat pins 360 are mounted to top platen 310. Heat pins 360 comprise a plurality of circular heat pins 410, a plurality of rectangular heat pins 420, a plurality of triangular indexing pins 430, and a plurality of square indexing pins 440.

Circular heat pins 410, rectangular heat pins 420, triangular indexing pins 430, and square indexing pins 440 have circular hollow centers 412, rectangular hollow centers 422, triangular hollow centers 432, and square hollow centers 442, respectively, to reduce the amount of thermoplastic prepreg material 110 (shown in FIG. 3) subject to heat during welding. Reducing the amount of thermoplastic prepreg material 110 subject to heat still allows top multi-ply assembly 310 and bottom multi-ply assembly 320 (shown in FIG. 3) to bond during the welding cycle. However, less heat is transferred through thermoplastic prepreg material 110, which further eliminates warping and undulation of layup 350 (shown in FIG. 3).

Figure 5:
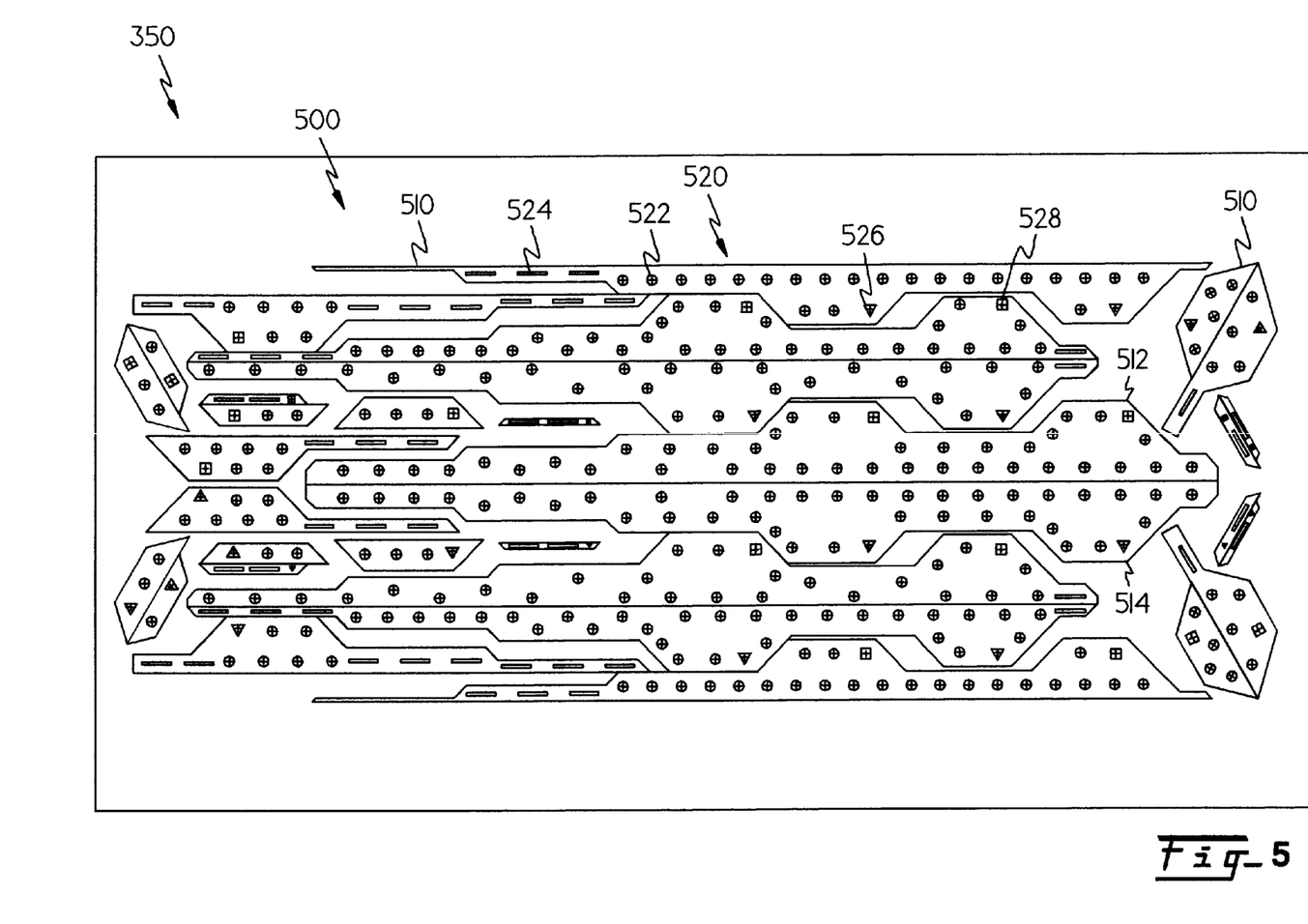
FIG. 5 is a top view of one example of a layup of the present invention taken generally along line 5—5 of FIG. 3.
Figure 6:
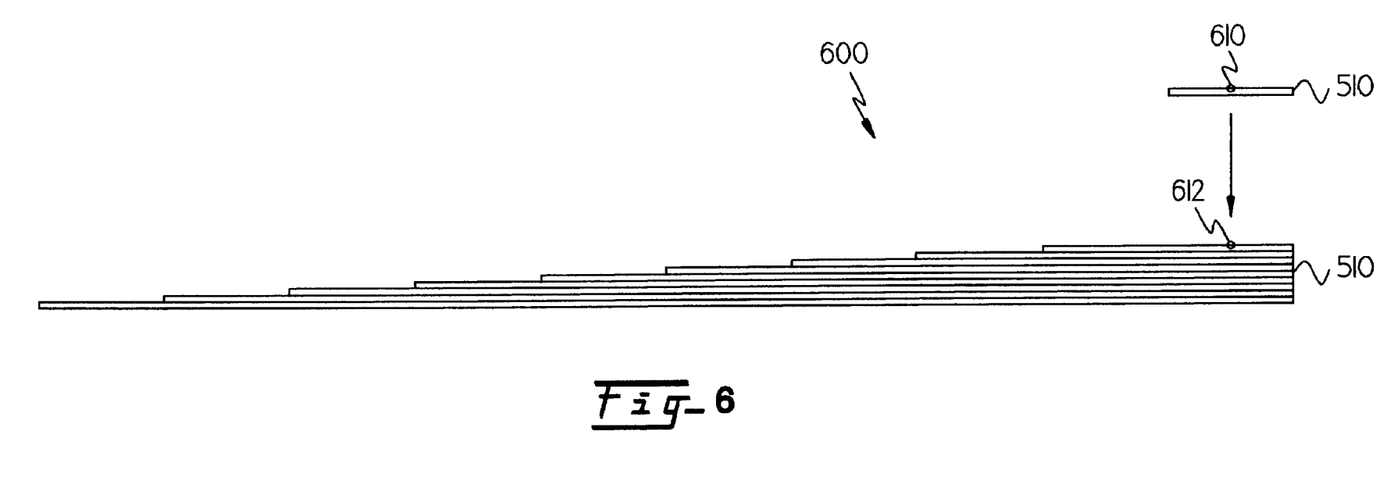
FIG. 6 is a front view of one example of a kit of the present invention.

Now referring to FIGS. 5 and 6, FIG. 5 is a top view of one example of layup 350 of the present invention taken generally along line 5—5 of FIG. 3. Layup 350 is overlaid with a layup pattern 500. Layup pattern 500 is comprised of a plurality of thermoplastic prepreg segments 510, wherein thermoplastic prepreg segments 510 are cut from layup 350 and assembled into a kit 600. As thermoplastic prepreg segments 510 are placed into kit 600, thermoplastic prepreg segments 510 are welded at first weld point 610 to kit 600 at second weld point 612.

Thermoplastic prepreg segments 510 are held together after being cut from layup 350 by welds from heat pins 360 (shown in FIG. 4B) as indicated by a plurality of weld marks 520. Weld marks 520 comprise a plurality of circular weld marks 522, a plurality of rectangular weld marks 524, a plurality of triangular indexing marks 526, and a plurality of square indexing marks 528 made by heat pins 360.

Moreover, layup 350 is large enough for two substantially identical kits 600 to be assembled from thermoplastic prepreg segments 510. Thus, thermoplastic prepreg segments 510 are divided into a plurality of left thermoplastic prepreg segments 512 and a plurality of right thermoplastic prepreg segments 514. Left thermoplastic prepreg segments 512 are marked with square indexing marks 528, but not triangular indexing marks 526 and right thermoplastic prepreg segments 514 are marked with triangular indexing marks 526, but not square indexing marks 528. After being cut from layup 350, thermoplastic prepreg segments 510 are separated into left thermoplastic prepreg segments 512 and right thermoplastic prepreg segments 514 according to whether thermoplastic prepreg segments 510 have square indexing marks 528 or triangular indexing marks 526. The left and right thermoplastic prepreg segments may advantageously be laid out in a symmetrical pattern on the layup. The respective indexing marks identify the pieces during assembly. Thus the indexing marks facilitate assembly, decrease assembly time, and reduce erroneous mix and matching of pieces between the left and right kits or wedges.

In one example of the invention, a thermoplastic prepreg panel patterned for use in a composite sabot was welded along the pattern shown in FIG. 5. The pattern shown comprises a thermal thermoplastic prepreg having 2 layers with 2 plies of varying orientations in each layer. The welding temperature was controlled in a range from 700 to 800 degrees. The welding cycle time was 15 seconds per cycle, and welding pressure was controlled in a range from 150 to 175 psi. It will be understood that this example is by way of illustration only and not by way of limitation of the present invention.

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by specifically different equipment and devices, and that various modifications, both as to the equipment details and operating procedures, may be accomplished without departing from the true spirit and scope of the present invention.

More specifically, materials for thermoplastic prepreg material 110 may be chosen from a wide array of materials to serve the intended purpose. The material may be selected from a wide array of fibrous materials, epoxies, and resins to serve the intended function and accommodate manufacturing processing to achieve the integral structure as indicated herein. The thermoplastic prepreg material 110 may also have any number of fiber orientations and plies.

Layup 350 may have any number of thermoplastic prepreg segments 510. Further, top platen 310 and bottom platen 320 may have any number of heat pins 360 to accommodate the number of thermoplastic prepreg pieces 510 on layup 350. These and other modifications are all intended to be within the true spirit and scope of the present invention.

What is claimed is:

1. A welding method for fabrication of composite structural parts comprising the steps of:
   a) welding multiple plies of thermoplastic prepreg into a welded multi-ply assembly by welding the plies at a plurality the plies of predetermined spaced apart points to form a plurality of spaced apart welds;
   b) aligning a plurality of welded multi-ply assemblies into a layup;
   c) using opposing platens having a plurality of heated pins to weld and index the layup, the plurality of heated pins including a plurality of index pins for indexing the layup by applying a layup pattern having a plural of indexing marks;
   d) cutting the layup into a plurality of thermoplastic prepreg segments along said layup pattern;
   e) forming the thermoplastic prepreg segments into kits by stacking the thermoplastic prepreg segments according to the plurality of indexing marks; and
   f) welding each kit to form a composite structural part.

2. The welding method of claim 1 wherein the plurality of heated pins are hollow to reduce surface heating during welding.

3. The welding method of claim 1 wherein the step of welding multiple plies of thermoplastic prepreg into a welded multi-ply assembly further comprises the steps of:
   a) assembling a plurality of plies into said multi-ply assembly so that said multi-ply assembly has a first layer having first plies, a second layer having second plies and where said first plies and said second plies are comprised of said thermoplastic prepreg material;
   b) orienting said first plies along a warp direction;
   c) orienting said second plies along a non-warp direction so that said second plies have ply seams oriented along said non-warp direction; and
   d) welding said second layer to said first layer so that spot welds occur adjacent to and along the direction of said ply seams.

4. The welding method of claim 3 wherein the steps b) and c) further comprises the steps of:
 a) assembling two multi-ply assemblies into said layup so that said layup comprises a top multi-ply assembly and a bottom multi-ply assembly;
 b) welding said top multi-ply assembly; and
 c) simultaneously welding said bottom multi-ply assembly.

5. The welding method of claim 4 wherein the step of using opposing platens having a plurality of heated pins to weld and index the layup further comprises the steps of:
 a) using a first set of the plurality of index pins for marking said top multi-ply assembly and said bottom multiply assembly with a plurality of first indexing marks so that said first indexing marks indicate right thermoplastic prepreg segments; and
 b) simultaneously using a second set of the plurality of index pins for marking said top multi-ply assembly and said bottom multiply assembly with a plurality of second indexing marks so that said second indexing marks indicate left thermoplastic prepreg segments, where said first indexing marks and said second indexing marks have differing characteristics.

6. The welding method of claim 3 wherein the step of orienting said second plies along a non-warp direction further comprises the step of offsetting the non-warp direction at least 30 degrees from the warp direction.

7. The welding method of clam 3 wherein the step of orienting said second plies along a non-warp direction further comprises the step of offsetting the non-warp direction at least 45 degrees from the warp direction.

8. The welding method of claim 3 wherein the step of orienting said second plies along a non-warp direction further comprises the step of offsetting the non-warp direction at least 120 degrees from the warp direction.

9. The welding method of claim 3 wherein the step of orienting said second plies along a non-warp direction further comprises the step of offsetting the non-warp direction at least 135 degrees from the warp direction.

10. A welding method for fabrication of kits comprising the steps of:
 (a) welding multiple plies of thermoplastic prepreg into a welded multi-ply assembly by welding the plies at a plurality of predetermined spaced apart points to form a plurality of spaced apart welds wherein the step of welding multiple ples of thermoplastic prepreg into a welded multi-ply assembly further includes the steps of:
  i) assembling a plurality of plies into said multi-ply assembly so that said multi-ply assembly has a first layer having first plies, a second layer having second plies and where said first plies and said second plies are comprised of said thermoplastic prepreg material,
  ii) orienting said first plies along a warp direction,
  iii) orienting said second plies along a non-warp direction so that said second plies have ply seams oriented along said non-warp direction, said non-warp direction being offset at least 45 degrees from the warp direction, and
  iv) welding said second layer to said first layer so that spot welds occur adjacent to and along the direction of said ply seams;
 (b) aligning a plurality of welded multi-ply assemblies into a layup;
 (c) using opposing platens having a plurality of heated pins to weld and index the layup, the plurality of heated pins including a plurality of index pins for indexing the layup by applying a layup pattern having a plurality of indexing marks;
 (d) cutting the layup into a plurality of thermoplastic prepreg segments along said layup pattern; and
 (e) forming the thermoplastic prepreg segments into kits by stacking the thermoplastic prepreg segments according to the indexing marks.

11. The welding method of claim 10 wherein the steps b) and c) further comprises the steps of:
 b) assembling two multi-ply assemblies into said layup so that said layup comprises a top multi-ply assembly and a bottom multi-ply assembly;
 d) welding said top multi-ply assembly; and
 e) simultaneously welding said bottom multi-ply assembly.

12. The welding method of claim 11 wherein the step of using opposing platens having a plurality of heated pins to weld and index the layup further comprises the steps of:
 (a) using a first set of the plurality of index pins for marking said top multi-ply assembly and said bottom multiply assembly with a plurality of first indexing marks so that said first indexing marks indicate right thermoplastic prepreg segments; and
 (b) simultaneously using a second set of the plurality of index pins for marking said top multiply assembly and said bottom multiply assembly with a plurality of second indexing marks so that said second indexing marks indicate left thermoplastic prepreg segments, where said first indexing marks and said second indexing marks have differing characteristics.

* * * * *